Aug. 28, 1951   J. C. HOOYKAAS   2,565,819
BACK-PEDALLING BRAKING HUB.
Filed May 31, 1949
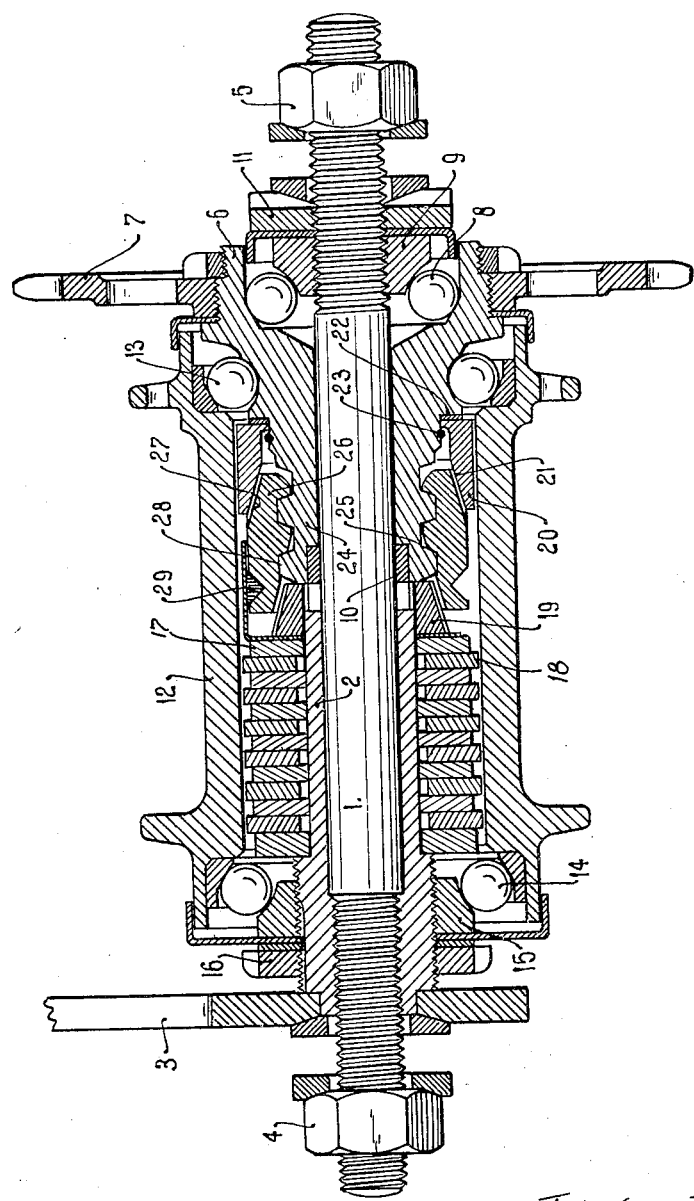
Inventor
Johannes C. Hooykaas
By Wendroth, Lind & Ponack
attorneys Patented Aug. 28, 1951

2,565,819

UNITED STATES PATENT OFFICE 2,565,819

BACK-PEDALING BRAKING HUB

Johannes C. Hooykaas, The Hague, Netherlands, assignor to Fijn-Mechanische Industrie "Becker's Sons" N. V., The Hague, Netherlands Application May 31, 1949, Serial No. 96,197
In the Netherlands June 25, 1948

2 Claims. (Cl. 192—6)

1

The invention relates to a back-pedalling braking hub comprising a non-rotary shaft, a driving member being rotatably mounted on said shaft and provided with a driving sprocket wheel or the like, a cone fixed on said shaft, a wheel hub coaxially surrounding said shaft and being rotatably supported at one end by said driving member and at the other end by said cone, a brake surrounding said shaft in the space within said hub, of which brake the part adjacent the driving member is axially slidably but non-rotatably, and the part remote from said driving member is unmovably mounted on said shaft, and a monopart brake actuating and clutching member provided with coupling faces and mounted inside the hub in the space surrounding the driving member, said brake actuating and clutching member being associated with the shaft through a slip-coupling and adapted to move on said driving member along a helical path, so that during normal driving, due to forward rotation of the driving member, the brake actuating and clutching member is disengaged from the brake and establishes a coupling between the wheel hub and the driving member, but during braking, due to backward rotation of the driving member, said brake actuating and clutching member is moved towards and actuates the brake.

In back-pedalling braking hubs of this type the brake actuating and clutching member has, during shifting from its driving position to its braking position, to move in such a manner, that first the driving member is disconnected from the wheel hub, thereupon the brake actuating and clutching member is moved towards the brake and finally the brake is compressed and thereby actuated. In order to shift the brake actuating and clutching member from the driving position to the braking position and vice versa the driving member, that means the pedals of the bicycle, has to make a free move.

It is of great importance, that the free stroke is as constant as possible, the brake can be easily adjusted and the adjustment of the ball bearings of the hub of the wheel is possible independently of the adjustment of the brake and without it being necessary to disconnect the shaft from the fork of the bicycle.

The invention provides an improved back-pedalling braking hub which meets the above-mentioned requirements in a simple manner. It principally consists in that the cone supporting the wheel hub is axially adjustably fixed on the shaft, the part of the brake adjacent the driving member abuts against the inner end face of

2 the driving member when the brake is in its disengaged position and that the part of the brake remote from the driving member is mounted on the shaft non-rotatably and independently of the adjacent cone.

In this braking hub the driving member constitutes a stop for the brake in its disengaged position. The consequence thereof is, that the part of the free stroke for moving the brake actuating and clutching member from the coupling position into a position, in which said member engages the brake, is constant and accurately predetermined in the factory by the precise manufacture of the parts of the braking hub. Another result of the brake abutting against the driving member is, that axial displacement of the driving member affects the adjustment of the brake.

Since the cone supporting the end of the wheel hub remote from the driving member is adapted to be adjusted independently of the fixed part of the brake, it is possible to adjust the ball bearings of the wheel hub without affecting the adjustment of the brake.

For the elucidation of the invention reference is made to the accompanying drawing illustrating a longitudinal sectional view of an embodiment according to the invention.

In the drawing 1 is a non-rotary shaft. Fixed to said shaft is a sleeve 2, to which an arm 3 is attached. This arm is meant for connection to the fork of the bicycle, to which the shaft 1 is secured by means of nuts 4 and 5, and it prevents the shaft 1 from being turned by the torque exerted thereon during braking. A driving member 6 provided with a sprocket wheel 7 for the driving chain is rotatably mounted on the shaft 1. This driving member is rotatably supported at one end by means of balls 8 and a cone 9 and at the other end by means of a slide bearing 10 directly on said shaft. The cone 9 is screwed on the shaft and is adapted to be adjusted in axial direction. It is locked by means of a counternut 11. The hub 12 of the wheel is rotatably supported at one end by means of balls 13 and the driving member 6 and at the other end by means of balls 14 and a cone 15 screwed on the sleeve 2. The cone 15 is also adapted to be axially adjusted and is secured against displacement by a counternut 16. Adjustment of the cone 15 is possible without it being necessary to loosen the nut 4 for the attachment of the shaft 1 to the fork.

Mounted on the sleeve 2 inside the wheel hub 12 is a brake consisting of friction plates 17, 18 which are alternately associated with said hub and said sleeve. The plates 17 are non-rotatably and slidably mounted on the sleeve 2 and the plates 18 are non-rotatably and slidably mounted with respect to the hub 12. For this purpose the hub 12 has a non-circular internal cross-section, and the sleeve 2 a non-circular external cross-section. The brake is adapted to be actuated by a brake cone 19, which is non-rotatably and slidably mounted on the sleeve 2.

A ring 20 having an internal conical face 21 is so mounted in the wheel hub 12, that it is only adapted to slide in axial direction with respect thereof. This ring is allowed to move axially with regard to the driving member 6 only a small distance, since it is mounted between a shoulder 22 of the driving member and a ring 23 resiliently engaging said member.

The driving member 6 has at its inner end a cylindrical part 24 provided with a thread 25 on which a brake actuating and clutching member 26 is screwed. This member has an external conical face 27, which cooperates with the conical face 21 of the ring 20. Said brake actuating and clutching member is also provided with an internal conical face 28, which cooperates with the brake cone 19. The brake actuating and clutching member 26 is prevented from rotation with respect to the shaft by a slip coupling 29 during its movement from the clutching position to the braking position and vice versa.

In the disengaged position of the brake, that means during forward driving of the driving member 6 or during the time said member is kept stationary (the free wheel position), the brake cone 19 abuts against the driving member 6.

The back-pedalling braking hub described above operates as follows:

When the driving member 6 is driven forward the brake actuating and clutching member 26 is screwed to the right on said driving member, so that a coupling is established through said clutching member 26 and the ring 20 between the driving member 6 and the wheel hub 12. If the pedals of the bicycle are kept stationary, the driving member 6 is stopped and the brake actuating and clutching member 26 rotates together with the rotating ring 20 and thereby is screwed from the driving member 6 to the left till said member 26 is released from the ring 20. Thereupon the member 26 is prevented from rotation by the slip coupling 29.

If the bicycle has to be braked the driving member 6 must be rotated backward. Thereby the brake actuating and clutching member 26, which is prevented to rotate, is screwed farther to the left, so that it engages, with its conical face 28, the brake cone 19. Also this cone prevents the member 26 from rotation, so that, when the driving member is rotated backward still farther the brake actuating and clutching member compresses and thereby actuates the brake.

Due to the fact, that in the disengaged position of the brake the brake cone 19 abuts against the driving member 6 and the clutching position of the brake actuating and clutching member 26 is determined by the shoulder 22 of the driving member, the stroke of the member 26, which is necessary for moving the same from the clutching position into the position in which said member 26 just engages the brake cone 19, is exactly determined. This stroke corresponds with a certain angular displacement of the driving member. The brake is moved from its disengaged position to the braking position by another angular displacement of the driving member, which solely depends on the adjustment of the brake. Both angular displacements determine the free stroke of the driving member for bringing the braking hub from its coupling position into its braking position and vice versa.

When the driving member 6 is axially adjusted on the shaft 1 the distance between the brake cone 19 and the shoulder 22 of the driving member is not changed at all. The effect of this adjustment is, that the distances between the plates 17, 18 of the brake, that means the adjustment of the brake, are modified. Consequently, direct adjustment of the brake is possible by displacement of the driving member by means of the cone 9. However, in that case it is necessary to displace the cone 15 also, as the driving member supports the wheel hub 12 at one end thereof.

The adjustment of the brake is carried out as follows:

First the counternut 16 and the cone 15 are loosened a little. This may be carried out while nut 4 remains tightened, so that the shaft 1 remains stationary in the fork. Thereupon the nut 5 and the counternut 11 are loosened and the brake is so adjusted by means of cone 9, that the plates of the brake just slide on each other or that no noticeable friction exists in the brake any more. This adjustment does not change the free stroke of the brake actuating and clutching member 26, since said free stroke has been determined once and for ever by the dimensions of the parts for actuating the brake and clutching the hub. After the adjustment of the brake the cone 9 is fixed by means of the counternut 1 and also the nut 5 is screwed tight again. Finally the cone 15 is so adjusted and fixed by its counternut 16, that the hub 12 is supported with a minimum of clearance by the balls 13 and 14.

Since during the adjustment of the back-pedalling braking hub the shaft 1 remains fixed and tight in the fork a very accurate adjustment is possible.

The adjustment of the ball bearings of the wheel hub 12 is thus independent of the adjustment of the brake, of which the adjustment is directly dependent on the displacement of the cone 9. By these facts the adjustment of the entire braking hub has become very simple.

It is to be noted that instead of a brake provided with friction plates a brake consisting of cones and a brake sleeve having bevelled counterfaces may be used.

What I claim is:

1. A back-pedalling braking hub provided with a freewheel and comprising, in combination, a non-rotary shaft, a stop member fixed to said shaft, a first cone provided on said stop member and forming part of a first bearing, an axially adjustable second cone provided on said shaft and forming part of a second bearing, a driving member rotatably supported by said second bearing as well as directly by the shaft, said driving member forming part of a third bearing and having a threaded cylindrical portion, a wheel hub surrounding said shaft and being rotatably supported by said first bearing and said third bearing, a clutching member screwed on the threaded portion of the driving member and adapted to be axially displaced by means of the relative rotation of said threaded portion, a slip coupling provided between said clutching member and a non-rotary part, a non-rotary axially slidable pressure ring and a brake mounted inside the wheel hub between said stop member and said pressure ring, said brake having cooperating rotary and non-rotary braking surfaces, said rotary braking surfaces being prevented from rotation with regard to the wheel hub, said clutching member being screwed towards the driving member on forward rotation of the latter thereby establishing a coupling between said driving member and the wheel hub, but being screwed from the driving member on backward rotation of the latter thereby compressing the brake between the stop member and the pressure ring for the actuation of the brake, said first cone being mounted for axial adjustment with respect to the stop member and said driving member forming an abutment for said pressure ring.

2. A back-pedalling braking and freewheel hub as claimed in claim 1, and wherein the first cone is adjustably mounted independently of the means for securing the shaft.

JOHANNES C. HOOYKAAS.

REFERENCES CITED

The following references are of record in the file of this patent:

UNITED STATES PATENTS

| Number | Name | Date |
| --- | --- | --- |
| 773,333 | Morrow | Oct. 25, 1904 |
| 807,715 | Beverly | Dec. 19, 1905 |
| 1,947,961 | Winkler | Feb. 20, 1934 |